A. CHRISTENSEN.
CLUTCH HOLDDOWN FOR FORDSON TRACTORS.
APPLICATION FILED JULY 5, 1921.

1,407,732.

Patented Feb. 28, 1922.

A. Christensen, Inventor

By C.A. Snow & Co.
Attorney

UNITED STATES PATENT OFFICE.

ANTON CHRISTENSEN, OF HOOPER, NEBRASKA.

CLUTCH HOLDDOWN FOR FORDSON TRACTORS.

1,407,732.  Specification of Letters Patent.  Patented Feb. 28, 1922.

Application filed July 5, 1921. Serial No. 482,400.

*To all whom it may concern:*

Be it known that I, ANTON CHRISTENSEN, a citizen of the United States, residing at Hooper, in the county of Dodge and State of Nebraska, have invented a new and useful Clutch Holddown for Fordson Tractors, of which the following is a specification.

This invention relates to locking devices to be used in connection with the clutch pedals of tractors for holding the clutch pedals into or out of operation.

The primary object of the invention is to provide a device of this character which may be readily and easily applied to the clutch pedal of a tractor, the same being designed to operate in conjunction with the dash thereof, to restrict movement of the clutch pedal.

A further object of the invention is the provision of means forming a part of the lock to permit the lock which is in the form of a vertical rod, to be manipulated by the foot of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawing:—

Figure 1:
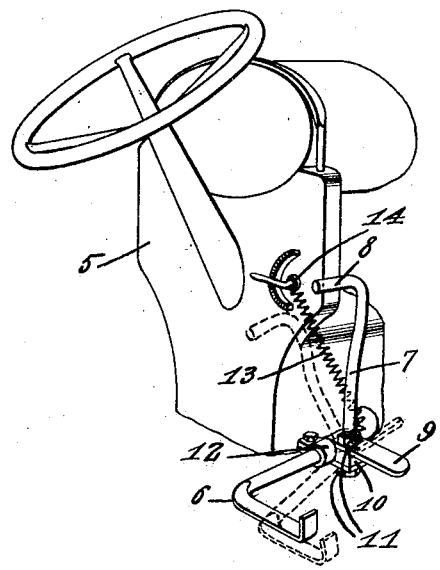
Figure 1 is a perspective view disclosing the locking device as applied to a clutch pedal of a tractor.
Figure 2:
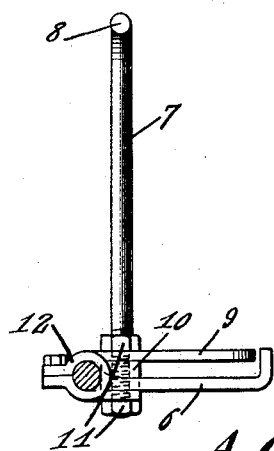
Figure 2 is an elevational view of the clutch pedal showing the locking arm as applied.

Referring to the drawing in detail, the reference character 5 designates the dash board of a tractor, which in the present showing is of the Fordson type, wherein the clutch pedal which is indicated at 6, moves in a vertical plane to accomplish the control of the clutch.

The lock is in the form of a vertical arm 7, which is provided with a right angled rearwardly extending extremity 8 which has connection with the clutch pedal 6 as through the medium of the pedal 9 that has one end bent around the clutch pedal 6 to permit the pedal 9 to move with respect to the pedal 6.

A block 10 is disposed between the pedal 9 and the portion thereof which is bent around the pedal 6 to hold the pedal 9 to the pedal 6 in a manner to allow pivotal movement thereof. As shown, the arm 7 has one end threaded and extended to suitable openings in the pedal 9 where the same has connection with the lock nuts 11 which secure the arm 7 to the pedal 9.

In order that the pedal 9 will be held against movement longitudinally of the pedal 6, a collar 12 is provided, which collar is clamped to the pedal 6 and contacts with one edge of the pedal 9. Having connection with the pedal 9 is a coiled spring 13, which has one end thereof anchored to the dash 5 as at 14, so that the arm 7 will be normally urged towards the dash 5.

In the operation of the device, assuming that the clutch pedal 6 is to be held out of operation, the operator places his foot on the pedal 9 to rock the arm 7 laterally or outwardly, whereupon the heel of the foot of the operator, is pressed on the pedal 6 to depress the same.

When the pedal 6 has been depressed, the coiled spring 13 comes into play and draws the arm 7 to a position as indicated by dotted lines in Figure 1 of the drawing, whereupon the arm rests at one side of the dash 5, the springs which normally throw the clutch pedal into operation, and which are not shown in the present drawing, acting to cause the arm 7 to frictionally engage the dash 5. It follows that when the arm 7 is contacting with the rear surface of the dash 5, the clutch pedal 6 is held out of operation or in a position as indicated by dotted lines in Figure 1 of the drawing.

When it is desired to throw the clutch into operation, the pedal 9 is depressed by the foot of the operator, whereupon the clutch pedal automatically moves upwardly to throw the clutch in.

Having thus described the invention, what is claimed as new is:—

1. In combination with a clutch pedal and dash board of a tractor, a locking arm supported by the clutch pedal and adapted to move with respect thereto, said locking arm adapted to normally engage one edge of the dash board, and said locking arm adapted to move to a position behind the dash board when the clutch pedal is depressed.

2. In combination with a clutch pedal and dash board of a tractor, a clutch locking means including a pedal rotatably supported on the clutch pedal, a vertical arm carried by the second mentioned pedal, and having a right angled end contacting with the dash board, means for normally urging the arm towards the dash board, and said locking arm adapted to move to a position behind the dash board when the clutch pedal is depressed.

3. In combination with a clutch pedal and dash board of a tractor, means carried by the clutch pedal and adapted to move behind the dash board when the clutch pedal is depressed for locking the clutch pedal in its lowermost position, and means for restricting movement of the locking means, longitudinally of the clutch pedal.

In testimony that I claim the foregoing as my own, I have hereto affixed my signature in the presence of two witnesses.

ANTON CHRISTENSEN.

Witnesses:
 PETER SULLIVAN,
 J. HOWARD HEINE.